US007320063B1

(12) United States Patent
Grohoski et al.

(10) Patent No.: US 7,320,063 B1
(45) Date of Patent: Jan. 15, 2008

(54) SYNCHRONIZATION PRIMITIVES FOR FLEXIBLE SCHEDULING OF FUNCTIONAL UNIT OPERATIONS

(75) Inventors: Gregory F. Grohoski, Austin, TX (US); Christopher H. Olson, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 312 days.

(21) Appl. No.: 11/051,431

(22) Filed: Feb. 4, 2005

(51) Int. Cl.
*G06F 9/312* (2006.01)
(52) U.S. Cl. .................................... 712/214
(58) Field of Classification Search ............. 712/214
See application file for complete search history.

(56) References Cited

U.S. PATENT DOCUMENTS

| 5,185,875 | A * | 2/1993 | Chinnaswamy et al. .... 711/121 |
| 5,560,029 | A | 9/1996 | Papadopoulos et al. |
| 5,978,830 | A * | 11/1999 | Nakaya et al. .............. 718/102 |
| 6,122,729 | A * | 9/2000 | Tran ............................ 712/244 |
| 6,182,152 | B1 | 1/2001 | Jonkers |
| 6,247,025 | B1 | 6/2001 | Bacon |
| 6,510,437 | B1 | 1/2003 | Bak et al. |
| 6,598,222 | B2 * | 7/2003 | Uchihira et al. ............ 717/154 |
| 6,625,660 | B1 * | 9/2003 | Guthrie et al. .............. 709/248 |
| 6,643,745 | B1 * | 11/2003 | Palanca et al. ............. 711/138 |
| 6,668,307 | B1 * | 12/2003 | Damron ....................... 711/137 |
| 6,922,472 | B2 * | 7/2005 | Lee et al. ...................... 380/37 |
| 7,162,617 | B2 * | 1/2007 | Ota et al. .................... 712/229 |
| 7,177,985 | B1 * | 2/2007 | Diefendorff ................. 711/137 |
| 2003/0140179 | A1 | 7/2003 | Witt et al. |
| 2005/0125795 | A1 | 6/2005 | Kissell |
| 2006/0031839 | A1 | 2/2006 | Kang |
| 2006/0031844 | A1 | 2/2006 | Dice et al. |

OTHER PUBLICATIONS

Birrell, et al., "Synchronization Primitives for a Multiprocessor: A Formal Specification," SRC Research Report 20, Aug. 20, 1987, 20 pages.
Goldstein, et al., "Enabling Primitives for Compiling Parallel Languages," 1995, 16 pages.
Dubois, et al., "Synchronization, Coherence, and Event Ordering in Multiprocessors," IEEE, 1998, pp. 9-21.

* cited by examiner

*Primary Examiner*—Eric Coleman
(74) *Attorney, Agent, or Firm*—Robert C. Kowert; Meyertons, Hood, Kivlin, Kowert & Goetzel, P.C.

(57) ABSTRACT

A processor employing synchronization primitives for flexible scheduling of functional unit operations. In one embodiment, a processor may include a number of functional units, each configured to retrieve operations for processing from an operation storage, and where each functional unit is configured to process retrieved operations independently of each other functional unit. The processor may further include instruction fetch logic configured to issue instructions for execution by the processor, where a subset of the instructions are executable to store operations for processing by the functional units into the operation storage. The operations stored by the subset of the instructions may include synchronization operations configured to coordinate processing of other ones of the operations by the plurality of functional units. In one particular implementation of the processor, the synchronization operations may include a suspend operation and a resume operation.

23 Claims, 9 Drawing Sheets

| | 0 | 1 | 2 | 3 | 4 | 5 | 6 | 7 |
|---|---|---|---|---|---|---|---|---|
| Fetch (F) | T0 | T3 | T6 | T2 | T7 | T5 | T1 | T4 |
| Cache (C) | | T0 | T3 | T6 | T2 | T7 | T5 | T1 |
| Pick (P) | | | T0 | T3 | T6 | T2 | T7 | T5 |
| Decode (D) | | | | T0 | T3 | T6 | T2 | T7 |
| Execute (E) | | | | | T0 | T3 | T6 | T2 |
| Memory (M) | | | | | | T0 | T3 | T6 |
| Bypass (B) | | | | | | | T0 | T3 |
| Writeback (W) | | | | | | | | T0 |
| Execution cycle | 0 | 1 | 2 | 3 | 4 | 5 | 6 | 7 |

*FIG. 3*

SYNCHRONIZATION PRIMITIVES FOR FLEXIBLE SCHEDULING OF FUNCTIONAL UNIT OPERATIONS

BACKGROUND OF THE INVENTION

1. Field of the Invention

This invention relates to processors, and more particularly, to techniques for synchronizing functional unit operations within a processor.

2. Description of the Related Art

In principle, complicated computational algorithms may be implemented by mapping the steps of the algorithm to simpler operations or primitives that may then be evaluated by computational hardware. For example, a typical microprocessor instruction set architecture (ISA) is usually sufficiently robust for functional implementation of arbitrarily complex algorithms. However, in many instances, the performance of the resulting algorithm implementation may be far from optimal, depending on the set of operations presented by the instruction set and the instruction overhead needed to control execution of the algorithm. For example, an instruction-based implementation of an algorithm that iterates over a small kernel of arithmetic operations may sacrifice a substantial degree of performance to the fetching, decoding and evaluation of instructions (such as branch instructions, for example) used to control the behavior of iteration.

In some instances, performance of certain algorithms may be improved by implementing some operations directly in hardware. For example, a direct hardware implementation of the iterative algorithm mentioned above may avoid the control overhead of branch instructions by using a state machine to control iteration. However, implementing the functionality of more complex operations within hardware presents additional challenges. In particular, more complex hardware operations in some respects may be more difficult to schedule for optimal performance than simpler hardware operations. For example, complex operations may have long and variable processing latency, which may frustrate attempts to generate a straightforward schedule of operations that also maximizes utilization of hardware resources.

SUMMARY

A processor employing synchronization primitives for flexible scheduling of functional unit operations is disclosed. In one embodiment, a processor may include a number of functional units, each configured to retrieve operations for processing from an operation storage, and where each functional unit is configured to process retrieved operations independently of each other functional unit. The processor may further include instruction fetch logic configured to issue instructions for execution by the processor, where a subset of the instructions are executable to store operations for processing by the functional units into the operation storage. The operations stored by the subset of the instructions may include synchronization operations configured to coordinate processing of other ones of the operations by the plurality of functional units. In one particular implementation of the processor, the synchronization operations may include a suspend operation and a resume operation.

A method is further contemplated that in one embodiment may include issuing instructions for execution by a processor, where a subset of the instructions are executable to store operations into an operation storage for processing by a number of functional units. The method may further include the functional units retrieving the operations for processing from the operation storage, where each functional unit is configured to process retrieved operations independently of the other functional units. The operations stored by the subset of the instructions may include synchronization operations configured to coordinate processing of other ones of the operations by the functional units.

BRIEF DESCRIPTION OF THE DRAWINGS

Other aspects of the invention will become apparent upon reading the following detailed description and upon reference to the accompanying drawings in which:

FIG. 3 is a pipeline diagram illustrating the flow of instructions through one embodiment of a processor core.

Figure 1:
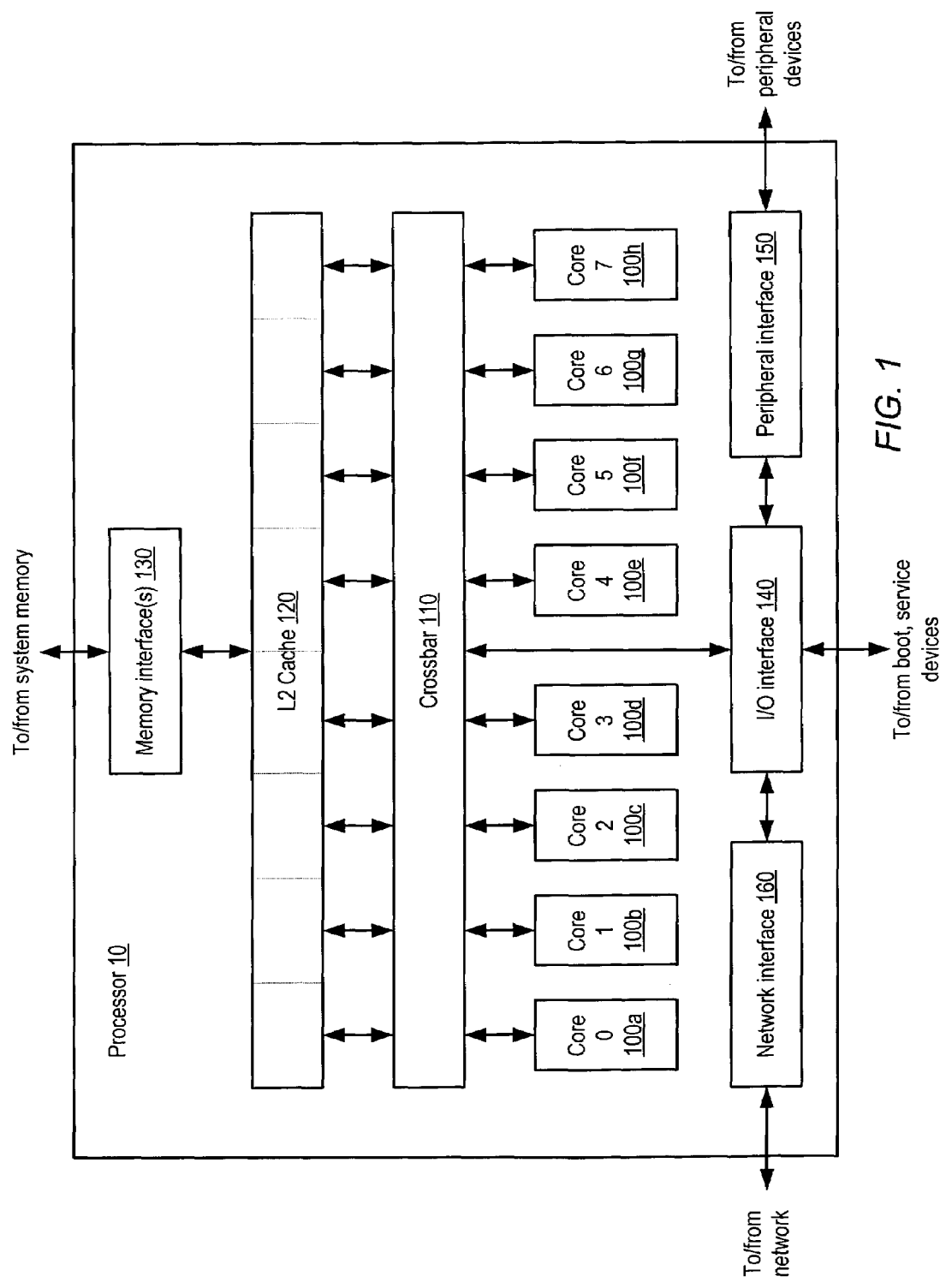
FIG. 1 is a block diagram illustrating one embodiment of a multithreaded processor.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF EMBODIMENTS

Overview of Multithreaded Processor Architecture

A block diagram illustrating one embodiment of a multithreaded processor 10 is shown in FIG. 1. In the illustrated embodiment, processor 10 includes a plurality of processor cores 100*a-h*, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150 and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC® V9 ISA, although in other embodiments it is contemplated that any desired ISA may be employed, such as x86, PowerPC® or MIPS®, for example. In the illustrated embodiment, each of cores 100 may be configured to operate independently of the others, such that all cores 100 may execute in parallel. Additionally, as described below in conjunction with the descriptions of FIG. 2 and FIG. 3, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requestors.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI Express™), although it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

Overview of Fine-Grained Multithreading Processor Core

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

Figure 2:
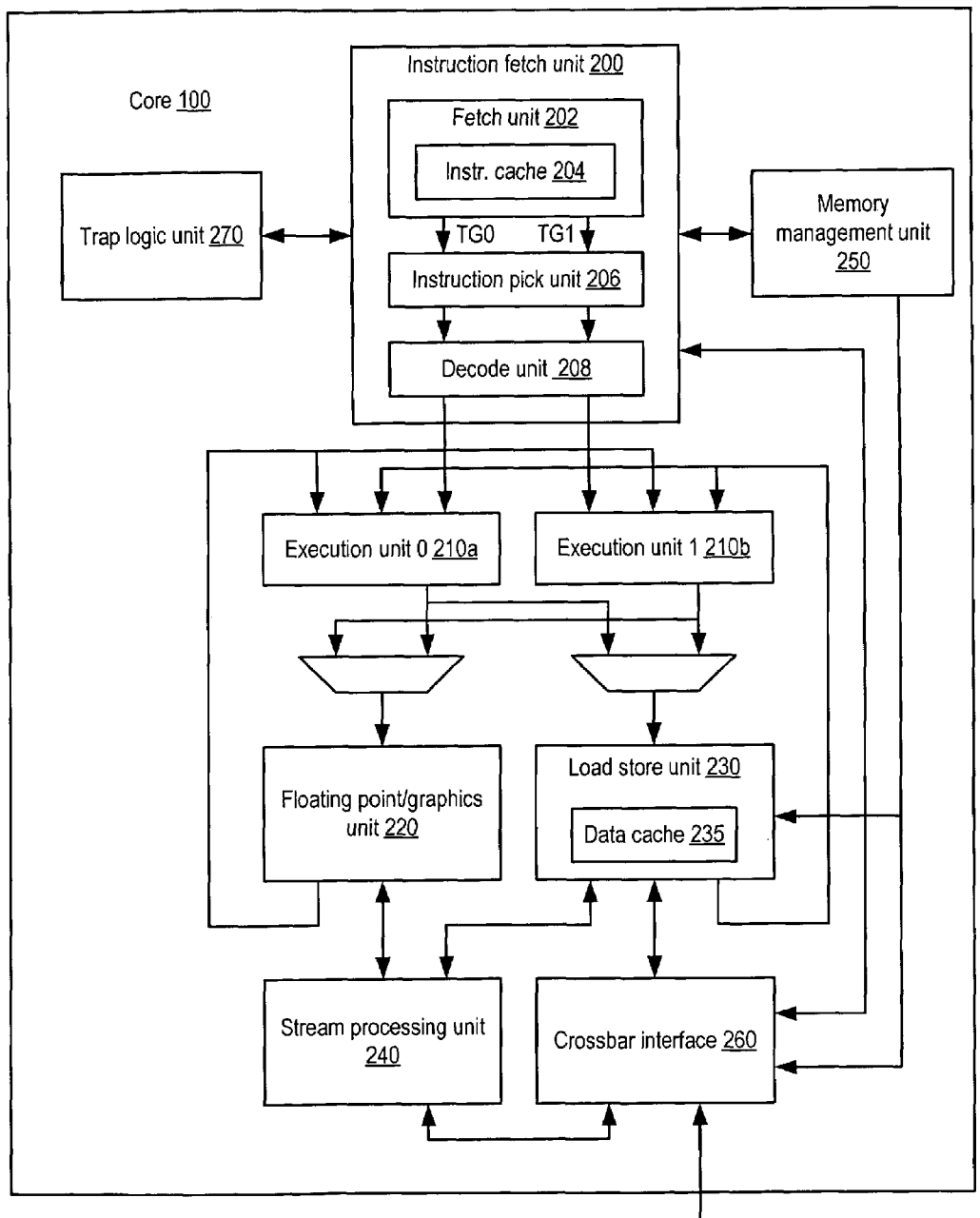
FIG. 2 is a block diagram illustrating one embodiment of a processor core.

One embodiment of core 100 configured to perform fine-grained multithreading is illustrated in FIG. 2. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210a-b. (Execution units 210a-b may also be referred to generically as EXUs 210.) Each of execution units 210a-b is coupled to both a floating point/graphics unit (FGU) 220 and a load store unit (LSU) 230. Each of the latter units is also coupled to send data back to each of execution units 210a-b. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 202 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement a respective instruction buffer corresponding to each thread in which several recently-fetched instructions from the corresponding thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1 (for example, if core 100 implements eight threads, each of TG0 and TG1 may include four threads).

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210a-b may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with a version of the Institute of Electrical and Electronics Engineers (IEEE) 754 Standard for Binary Floating-Point Arithmetic (more simply referred to as the IEEE 754 standard), such as add, subtract, multiply, divide, and certain transcendental functions. Also, in one embodiment FGU 220 may implement partitioned-arithmetic and graphics-oriented instructions defined by a version of the SPARC® Visual Instruction Set (VIS™) architecture, such as VIS™ 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 204 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction issue or execution. For example, in one embodiment SPU 240 may be configured to receive operations and operands via control registers accessible via software; in the illustrated embodiment SPU 240 may access such control registers via LSU 230. In such embodiments, SPU 240 may be indirectly programmed or configured by instructions issued from IFU 200, such as instructions to read or write control registers. However, even if indirectly programmed by such instructions, SPU 240 may execute independently without further interlock or coordination with IFU 200. In another embodiment SPU 240 may receive operations (e.g., instructions) and operands decoded and issued from the instruction stream by IFU 200, and may execute in response to such operations. That is, in such an embodiment SPU 240 may be configured as an additional functional unit schedulable from the instruction stream, rather than as an independent coprocessor.

In some embodiments, SPU 240 may be configured to freely schedule operations across its various algorithmic subunits independent of other functional unit activity. Additionally, SPU 240 may be configured to generate memory load and store activity, for example to system memory 810 described below. In the illustrated embodiment, SPU 240 may interact directly with crossbar interface 260 for such memory activity, while in other embodiments SPU 240 may coordinate memory activity through LSU 230. In one embodiment, software may poll SPU 240 through one or more control registers to determine result status and to retrieve ready results, for example by accessing additional control registers. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate result retrieval and processing.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requestors. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 206 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program order) complete or update architectural state.

Exemplary Core Pipeline Diagram

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 3. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 3.

In the illustrated embodiment, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

Stream Processing Unit Interfacing

As described above, in some embodiments SPU 240 may be configured as a coprocessor capable of processing operations on data independently of instruction fetch, pick, issue and execution performed by core 100 via IFU 200, execution units 210 and other functional units. For example, in some embodiments SPU 240 may be configured to implement cryptographic or other types of functions that may have high or variable latency, may be iterative or recursive, or may otherwise be relatively complex functions in comparison to the instructions executed elsewhere within core 100. Operations that SPU 240 is configured to process may be generically referred to as SPU operations. As an alternative to exposing the instruction scheduling logic of IFU 200 to the complexities of scheduling complex operations or simpler sub-operations within SPU 240, SPU 240 may be configured to process operations autonomously and present a simpler interface to the rest of core 100. For example, SPU 240 may include hardware state machines or microcode configured to internally coordinate the processing steps of a given SPU operation.

Even if an embodiment of SPU 240 is configured to operate relatively independently of other units within a core 100, in general such an embodiment may still interface in some fashion with the remainder of core 100. For example, SPU 240 may need to receive information specifying what operations to perform on what particular data, even if it is capable of performing those operations autonomously. In some embodiments, logic within core 100 may be configured to directly interface with SPU 240 in order to program or control the operation of SPU 240. For example, in some embodiments, IFU 200 may be configured to decode certain instructions that involve functionality implemented by SPU 240 and to correspondingly convey operations to SPU 240 for processing. In some such embodiments, IFU 200 may schedule such operations in a manner similar to the scheduling of instructions to be executed by other functional units, for example by issuing operations to SPU 240 for processing and waiting for them to complete.

In an alternative approach, some embodiments of SPU 240 that are configured for autonomous operation may be programmed indirectly. For example, in one embodiment IFU 200 may be configured to decode instructions and issue corresponding operations to SPU 240 for processing without waiting for SPU 240 to complete a previously scheduled operation. In another embodiment, no specific SPU-related instructions may be provided within an instruction set architecture (ISA). Instead, SPU 240 may be indirectly programmed by software including generic instructions (e.g., non-SPU-specific load and store instructions) that are executed by the typical instruction pipeline within core 100.

Figure 4:
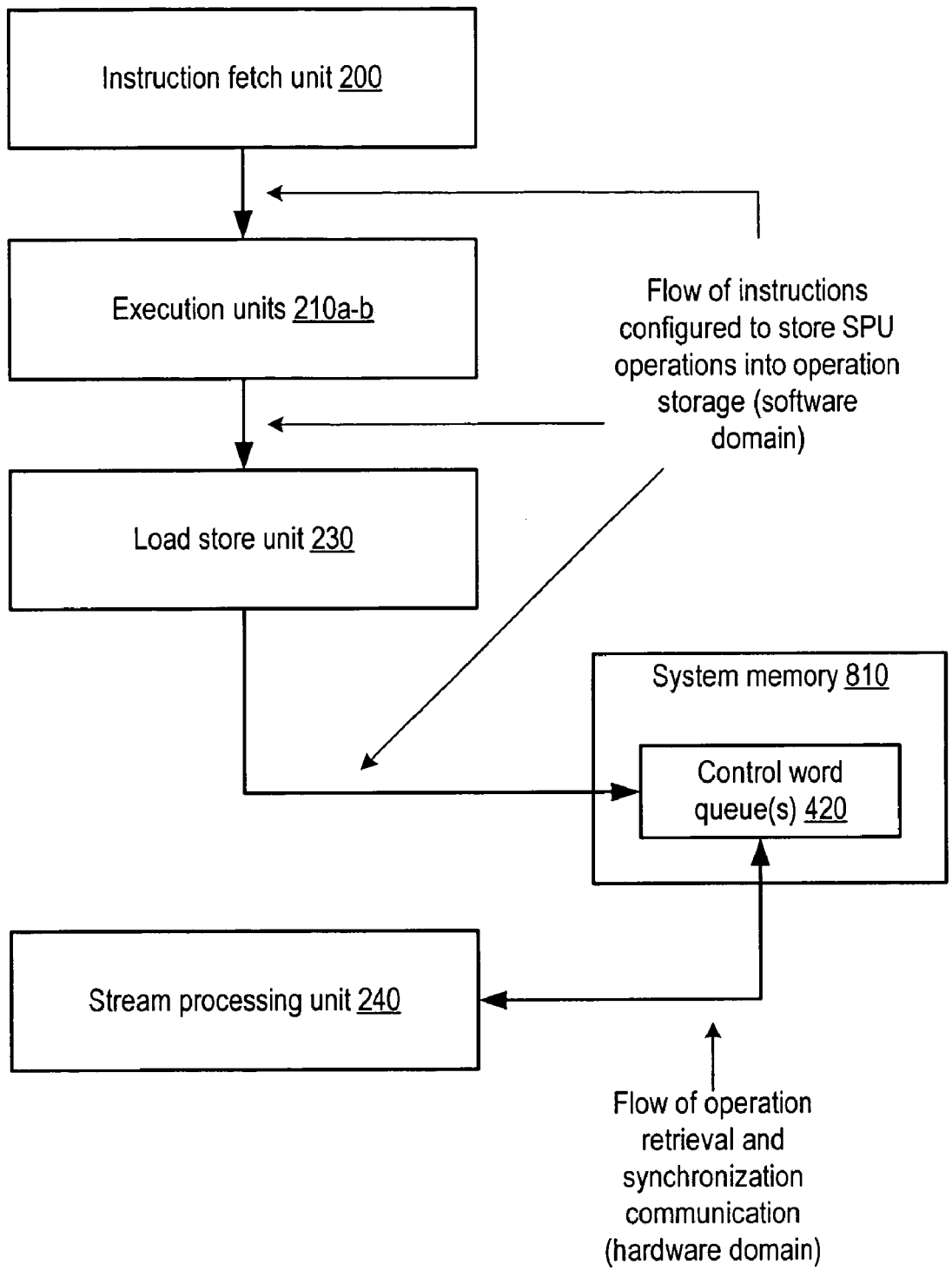
FIG. 4 is a block diagram illustrating one embodiment of a processor core including functional units configured for indirect programming by software.

One embodiment illustrating the general flow of instructions and SPU operations in an embodiment of core 100 in which SPU 240 is configured to be indirectly programmed by software is shown in FIG. 4. A number of previously-described elements of core 100 as well as processor 10 have been omitted for clarity, although it is understood that the illustrated embodiment may encompass such elements. Generally speaking, in the illustrated embodiment SPU 240 may be programmed indirectly by instructions that are configured to store within an operation storage control information corresponding to operations to be processed by SPU 240. For example, the instructions may include store instructions configured to store data values reflecting SPU operations, which data values may also be referred to as control words, into one or more control word queues 420 within a system memory 810. SPU 240 may be configured to retrieve operations for processing from control word queue(s) 420. Details of control word queue(s) 420 and SPU operations that may be stored therein are discussed in greater detail below in conjunction with the description of FIG. 5.

In the illustrated embodiment, the path of instructions that are decoded and issued by IFU 200 does not directly interface with SPU 240. Instead, two distinct paths are shown. The first path represents the flow of instructions configured to store control words reflecting SPU operations within control word queue(s) 420. Specifically, these instructions, which may be interspersed with other instructions constituting a thread, program or other type of software process, may be fetched by IFU 200 and executed within execution units 210 and/or load store unit 230. As a consequence of execution of these instructions, data values representative of various SPU operations may be stored within control word queue(s) 420 as shown. For example, in one embodiment, execution by a given core 100 of a store instruction configured to store an SPU operation within an operation storage may result in store data propagating through crossbar interface 260 to crossbar 110, then to L2 cache 120, memory interface 130 and ultimately to system memory 810.

It is contemplated that in some embodiments, the details of the SPU operations stored within control word queue(s) 420, such as the order in which operations appear within queue(s) 420, the specific encodings of the operations, any parameters or pointers referenced by the operations, etc. may be entirely determined by software. That is, in some such embodiments, scheduling of operations for processing by SPU 240 may be performed entirely within the software domain as program instructions, and those elements of core 100 that execute such instructions need not be aware that those instructions are related in any way to scheduling of SPU operations. In such embodiments, the control interface between software and SPU 240 may be mostly or completely transparent to the instruction execution elements of core 100.

The second path illustrated within FIG. 4 represents the retrieval of operations from control word queue(s) 420 by SPU 240 for processing. In the illustrated embodiment, SPU 240 may retrieve stored operations independently of the software actually storing the operations. For example, SPU 240 may include hardware state machines or other logic configured to detect updates to control word queue(s) 420 and responsively to access system memory 810. In some embodiments, the retrieval and processing of operations by SPU 240 may occur mostly or completely transparently to the software storing operations within control word queue(s) 420. For example, in one embodiment described in greater detail below, software may update a control or status register within SPU 240 after storing one or more operations within control word queue(s) 420. Subsequently, SPU 240 may retrieve and process the stored operations entirely within the hardware domain, notifying software via a status register or interrupt when processing is complete. In some embodiments, in addition to retrieving operations from control word queue(s) 420, SPU 240 may be configured to modify data stored within control word queue(s) 420, for example to synchronize operation of internal SPU functional units as described in detail below.

It is contemplated that in some embodiments, the indirect method of programming SPU 240 shown in FIG. 4 may be employed even if programmer-visible software does not directly control the storing of operations within control queue(s) 420. For example, in some embodiments core 100 may implement state machines or microcode configured to perform the actions necessary to store an SPU operation within control queue(s) 420 in a manner transparent to software. Also, as noted in greater detail below, control queue(s) 420 or other suitable operation storage may be either internal or external to a core 100.

Queue-Based SPU Interface

Allowing software to indirectly interface with SPU 240 may simplify the implementation of SPU 240 as well as the integration and interfacing of SPU 240 with the rest of core 100. For example, in some embodiments in which generic load and store instructions already part of the ISA of core 100 are used to access control word queue(s) 420, no special hardware support may need to be provided to enable software to program SPU 240. At the same time, allowing SPU 240 to process operations independently of instructions being fetched and executed within core 100 may simplify the design of IFU 200 and may enable better utilization of instruction execution resources within core 100.

However, the interfacing requirements of SPU 240 may become more complex in embodiments of SPU 240 that include multiple functional units each capable of independent processing. In such embodiments, maximal utilization of the processing resources SPU 240 may be achieved only if as many independent functional units as possible have operations to process. However, in some instances, different SPU operations may be functionally independent (e.g., SPU 240 may be configured to process them in different functional units capable of independent processing) yet logically dependent. That is, one SPU operation may depend for its input on the result of another SPU operation, such that the two operations may not be processed concurrently even though they may be functionally independent.

For example, in various embodiments a network packet processing protocol (such as the Secure Sockets Layer (SSL) protocol, Transport Layer Security (TLS) protocol, or Internet Protocol Security protocol (IPsec), for example) may specify that data in a given packet is packet is to be hashed according to a hash algorithm and then encrypted according to a cipher algorithm, or vice versa. Correspondingly, in some embodiments SPU 240 may be configured to implement a hash functional unit and a cipher functional unit each capable of independent processing of packet data. However, correct processing of any given packet may require that these functional units be properly coordinated with respect to that packet.

The requirement to synchronize or coordinate functional unit processing of individual packets for correctness combined with the goal of maximizing utilization of different functional units may present complications in designing and interfacing SPU 240 with software or other hardware. For example, in one embodiment SPU 240 may include operation scheduling logic configured to detect dependencies among operations stored within control word queue(s) 420 and to schedule operations among available functional units to maximize utilization and avoid dependencies, all in a manner transparent to software. However, such scheduling logic may be considerably complex to implement and verify; for example, the task may be comparable in some embodiments to designing a version of the IFU 200 logic tailored for the operations of SPU 240. Particularly in instances where SPU operation latency is long relative to the number of functional units (such that the number of scheduling decisions per unit of processing time is relatively low), the cost of implementing scheduling hardware within or on behalf of SPU 240 may be unacceptably high.

In an alternative embodiment, SPU 240 may be configured to expose the control of some aspects of functional unit coordination and synchronization to software. For example, in addition to processing various different kinds of data-oriented operations that may be scheduled by software (e.g., hash, cipher or other types of operations), SPU 240 may be configured to process control-oriented operations that effect the coordination and synchronization of functional units, which control-oriented operations may also be scheduled by software. Such control-oriented SPU operations may also be referred to as synchronization operations or synchronization primitives.

Figure 5:
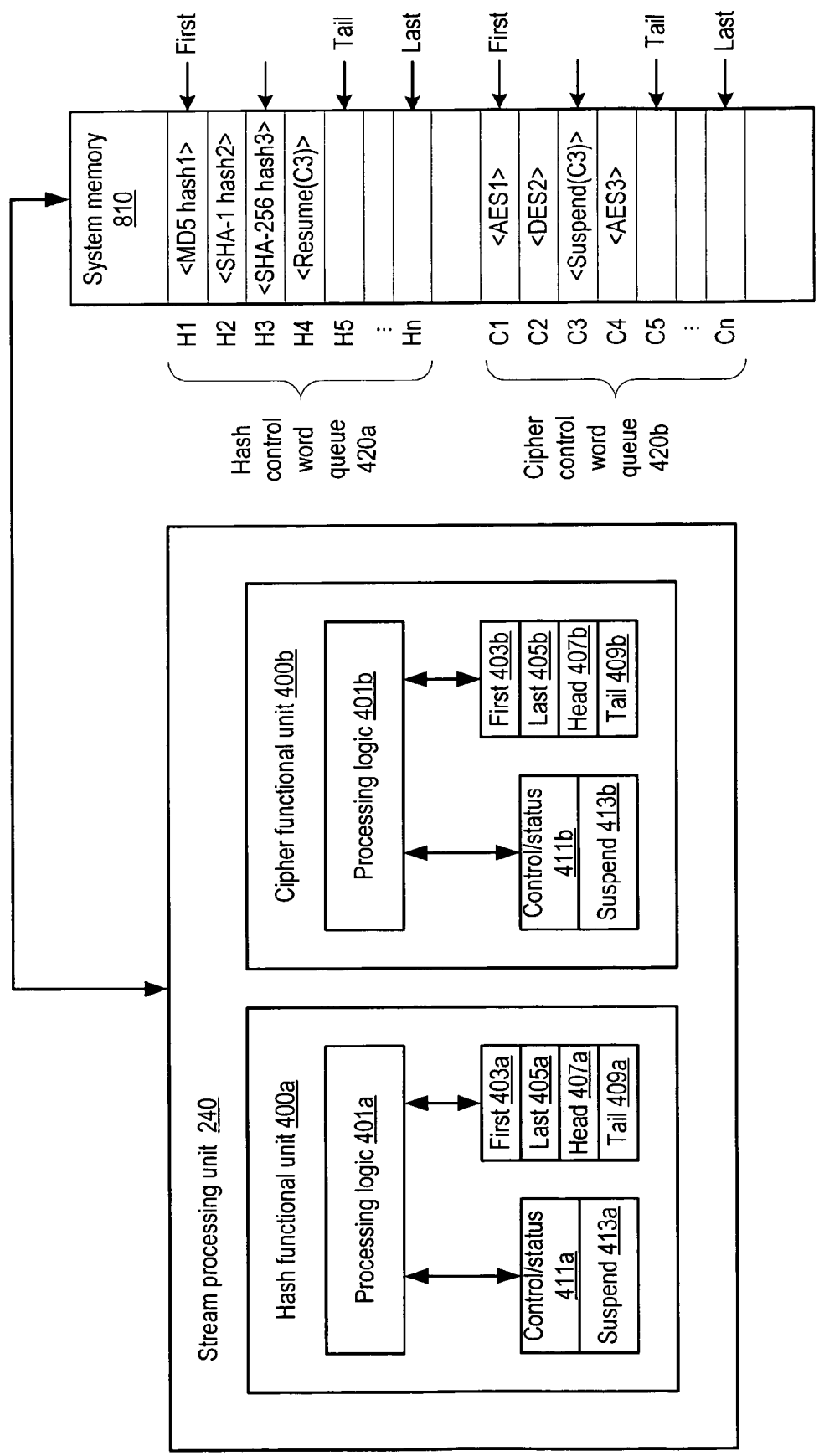
FIG. 5 is a block diagram illustrating one embodiment of a processing unit including support for software-based operation scheduling using synchronization operations.

One embodiment of SPU 240 that includes support for software-based operation scheduling using synchronization operations is illustrated in FIG. 5. In the illustrated embodiment, SPU 240 includes a hash functional unit 400a and a cipher functional unit 400b. Each of functional units 400a-b includes respective processing logic 401a-b coupled to respective sets of registers including first registers 403a-b, last registers 405a-b, head registers 407a-b, tail registers 409a-b, control/status registers 411a-b and suspend registers 413a-b. It is contemplated that in other embodiments, SPU 240 may include different numbers of functional units 400, and that different functional units 400 may include additional or different types of logic and registers in contrast to those shown.

Additionally, in the illustrated embodiment, SPU 240 is configured to interact with system memory 810. In various embodiments as described above, SPU 240 may be indirectly coupled to system memory 810 via other logic such as crossbar interface 260, crossbar 110, etc. In the illustrated embodiment, system memory 810 is configured to include a hash control word queue 420a that includes an arbitrary number of entries denoted H1-Hn, as well as a cipher control word queue 420b that includes an arbitrary number of entries denoted C1-Cn. In some embodiments, it is contemplated that queues 420a-b may be implemented within storage internal to core 100 rather than within system memory 810.

In the following discussion, general operation of functional units 400 in conjunction with queues 420 is given first. Subsequently, details of synchronizing operations among functional units 400 are provided.

Each of functional units 400a-b may be configured to process SPU operations independently of other ones of functional units 400. For example, in one embodiment hash functional unit 400a may implement logic configured to process hash types of SPU operations, such as operations implementing a version of the Message Digest 5 (MD5) algorithm, versions of the Secure Hash Algorithm-1/256 (SHA-11/SHA-256), or other types of hash algorithms. Such hash operations may also be generically referred to as cryptographic hash operations. Similarly, in one embodiment, cipher functional unit 400b may implement logic configured to process cipher or cryptographic types of SPU operations, such as operations implementing a version of the Advanced Encryption Standard (AES) algorithm, a version of the Data Encryption Standard/Triple Data Encryption Standard (DES/3DES) algorithms, a version of the Ron's Code #4 (RC4) algorithm, or other types of cipher algorithms. Such cipher operations may also be generically referred to as cryptographic cipher operations. Further, in one embodiment, hash functional unit 400a may be configured to process a hash operation concurrently with and independently of cipher functional unit 400b's processing of a cipher operation.

It is contemplated that in some embodiments, functional units 400 need not be restricted to implementing hash or cipher types of operations, but may implement any suitable type of function, including integer or floating point functions or algorithms as well as operations on other data types. Further, in some embodiments functional units 400 may implement overlapping types of operations. For example, in one embodiment hash functional unit 400a may implement some or all of the cipher operations supported by cipher functional unit 400b, or vice versa. More generally, any suitable combination of operations may be implemented by a given functional unit 400, and different functional units 400 may implement either the same or different types of operations.

Processing logic 401 may generally include any suitable datapath and/or control logic configured to implement the operations supported by a corresponding functional unit 400. For example, in one embodiment processing logic 401a of hash functional unit 400a may include datapath structures such as adders, multipliers, shifters, multiplexers, Boolean logic or other structures suitable for performing the data manipulation required by the operations of hash functional unit 400a. Such an embodiment of processing logic 401a may also include control structures such as state machines or microcode configured to coordinate the operation of datapath structures to implement the desired operations. For example, control structures within processing logic 401a may be configured to sequence the datapath structures in order to perform distinct steps of multi-step algorithms.

Functional units 400a-b may be configured to retrieve operations for processing, which operations were previously stored by software to respective control word queues 420a-b as described above in conjunction with the description of FIG. 4. In certain embodiments, a respective control word queue 420 may be defined for each functional unit 400 implemented by SPU 240, as shown in FIG. 5. However, it is contemplated that in some embodiments, a single control word queue 420 common to all functional units 400 may be provided. For example, in one embodiment the format of the control words stored in a single control word queue 420 may include one or more bits indicative of a particular functional unit 400 to which a given control word corresponds. SPU 240 may correspondingly be configured to decode such bits, or other suitable information, to steer operations to appropriate functional units 400.

Generally speaking, control word queues 420 may be instances of an operation storage. In the illustrated embodiment, each of control word queues 420 may be implemented as a first-in, first-out (FIFO) queue. That is, operations stored within control word queues 420 may be processed by functional units 400 in the order in which the operations were stored within queues 420. However, operation storage need not necessarily be configured as a queue. For example, in some embodiments a control word structure 420 may be configured as a stack (e.g., a last-in, first-out (LIFO) structure), a linked list, or any other type of data structure suitable for storing operations prior to their retrieval by functional units 400. Although subsequent discussion of control details of functional units 400 and control word queues 420 assumes that operation storage for SPU 240 is configured as one or more FIFO queues, it is intended that operation storage encompass any suitable type of storage, and it is contemplated that the control details of functional units 400 may be adjusted to correspond to the particular configuration of operation storage that is implemented.

In some embodiments, each of functional units 400*a-b* may include a number of registers configured to assist in the management of a corresponding control word queue 420. In the illustrated embodiment, these registers include first register 403*a-b*, last register 405*a-b*, head register 407*a-b*, and tail register 409*a-b*. Collectively, these registers may be referred to as queue registers. (In embodiments in which only a single control word queue 420 is shared by multiple functional units 400, a single set of corresponding queue registers may be implemented within and maintained by SPU 240 on behalf of functional units 400.) Queue registers may be implemented as software-accessible control registers. For example, in some embodiments software may be configured to read or write a particular control register by specifying an appropriate instruction (such as a read-from- or write-to-control-register instruction, or another suitable variant) along with an address or other unique identifier corresponding to the particular control register to be accessed. Thus, in some embodiments, some or all queue registers may be read and/or modified either directly, by a particular functional unit 400, or by instructions (e.g., software) issued for execution from IFU 200.

Queue registers may be configured to define the boundaries of a particular control word queue 420 within a larger storage structure, such as system memory 810, and to define the points of insertion and retrieval of operations with respect to a particular control word queue 420. In one embodiment, first registers 403*a-b* and last registers 405*a-b* may be configured to store the respective memory addresses corresponding to the first and last entries of control word queues 420*a-b* within system memory 810. In the illustrated embodiment, "first" and "last" pointers corresponding to first and last registers 403/405 indicate the lowest entries (e.g., H1, C1) and highest entries (e.g., Hn, Cn) within queues 420, respectively. However, it is contemplated that queue entries may be stored within system memory 810 in either ascending or descending order. That is, the first logical entry of a queue 420 may have a corresponding address within first register 403 that is either lower or higher than the address of the last logical entry as stored within last register 405. It is contemplated that any given control word queue 420 may include an arbitrary number of entries, and that different queues 420 may include different numbers of entries. In many embodiments, queue entries may be uniformly sized according to any suitable size, such as 16 bytes or 64 bytes, for example. However, in some embodiments different queues 420 may employ different sizes of entries, and variable-size entries within a given queue 420 are contemplated.

Generally speaking, a FIFO queue may be understood as a data structure having a head and a tail, in which data items are inserted into the queue at the tail and removed from the queue at the head. Further, as items are removed from the head of the queue, lower entries within the queue propagate towards the head of the queue in order, such that items are removed from the queue in the same order in which they were inserted. In many embodiments, rather than moving data between fixed head and tail locations, FIFO queues may be implemented by statically storing data items within fixed locations, e.g., locations of system memory 810, and altering head and tail pointers to refer to different queue entries as items are inserted or removed. In the illustrated embodiment, head registers 407*a-b* may be configured to store the respective addresses of the entries at the head of queues 420*a-b* (that is, the entries next to be removed from queues 420*a-b*) while tail registers 409*a-b* may be configured to store the respective address of the entries at the tail of queues 420*a-b*. Generally speaking, a given tail register 409 may define the point at which software may insert new SPU operations within a control word queue 420 as described above, while a given head register 407 may define the point at which a given functional unit 420 may retrieve a stored operation from such a control word queue 420 for processing. It is noted that in some embodiments, queues 420 may be implemented within cacheable portions of system memory 810. Consequently, in such embodiments references to addresses stored in queue registers may generate accesses to caches such as data cache 235 or L2 cache 120. In some such embodiments, queue-related accesses to system memory 810 may only be generated in case of cache misses.

Figure 6A:
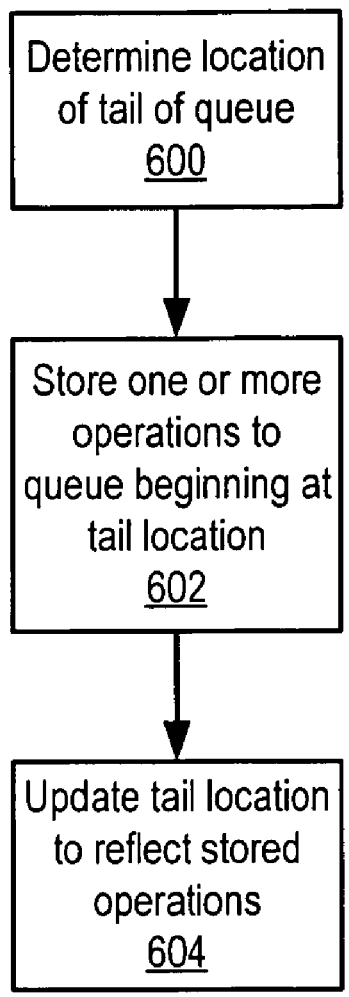
FIG. 6A is a flow diagram illustrating one embodiment of a method of storing operations within a control word queue.

One embodiment of a method of storing operations within a control word queue 420 is illustrated in FIG. 6A. Referring collectively to FIGS. 1-6A, operation begins in block 600 in which the location of the tail of the queue 420 of interest is determined. For example, in one embodiment software may be configured to read the tail register 409 corresponding to the queue 420.

Once the location of the tail of the queue 420 is determined, one or more operations are stored to the queue 420 beginning at the tail location (block 602). For example, in one embodiment software may use store instructions to store control word data corresponding to a new queue entry at the location indicated by tail register 409. In some embodiments, multiple operations may be stored within several distinct entries of queue 420 at a time, in the order in which the operations should be retrieved and processed.

After operations have been successfully stored to queue 420, the location of the tail of the queue is updated to reflect the additional operations (block 604). For example, in one embodiment software may adjust (e.g., increment) the value of the tail register 409 as originally read to reflect the number of queue entries written. In one such embodiment, the adjusted value of tail register 409 may indicate the next free entry within queue 420. The adjusted value may then be stored to tail register 409.

In some embodiments, the steps of storing operations within a control word queue 420 as described above may be performed under the control of hardware, microcode or firmware rather than user-visible software. If only a single process (either hardware or software) is configured to store operations to queue 420, modification of tail register 409 need not be performed atomically. However, if multiple different processes may store operations to queue 420, some coordination among the processes may be necessary to avoid corruption of queue 420. For example, atomic instructions, resource locks or other types of inter-process synchronization may be used to delegate exclusive access to a queue 420 and its associated queue registers to a particular process for updating.

Figure 6B:
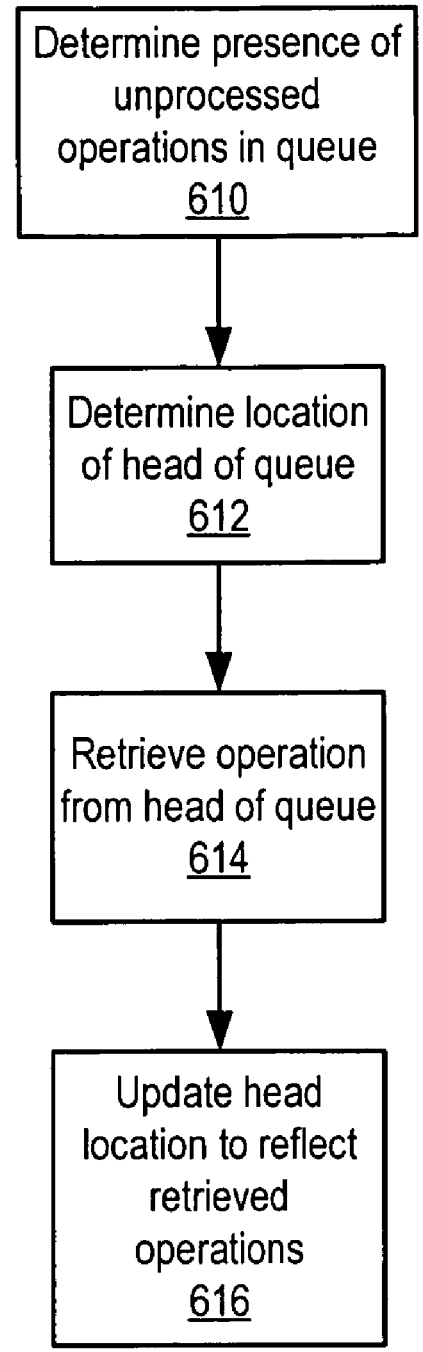
FIG. 6B is a flow diagram illustrating one embodiment of a method of retrieving operations from a control word queue for processing.

One embodiment of a method of retrieving operations from a control word queue 420 for processing is illustrated in FIG. 6B. Referring collectively to FIGS. 1-6B, operation begins in block 610 in which the presence of unprocessed operations within a queue 420 is determined. For example, in an embodiment where the tail register 409 of a queue 420 is updated to point to the next free entry within the queue 420 when operations are stored, the inequality of head register 407 and tail register 409 may indicate that the queue 420 includes unprocessed operations. As a more detailed example, in one embodiment a queue 420 may be empty when both its head register 407 and tail register 409 point to the same entry (e.g., H1). When an operation is stored to queue 420, it may be stored to entry H1 and tail register 409 may be updated to point to entry H2 as described above. Consequently, until the new operation is removed from queue 420, head register 407 and tail register 409 may be unequal, indicating the presence of an unprocessed operation. In some embodiments, a functional unit 400 may be configured to monitor head register 407 and tail register 409 to detect this condition.

When unprocessed operations are detected within queue 420, the location of the head of the queue 420 of interest is determined (block 612). For example, in one embodiment a functional unit 400 may be configured to read the head register 407 corresponding to the queue 420.

Once the location of the head of the queue 420 is determined, an operation is retrieved from the head of the queue 420 (block 614). For example, in one embodiment a functional unit 400 may cause a read to the memory location(s) of system memory 810 corresponding to the entry reflected by the head register 407. In some embodiments, a functional unit 400 may retrieve more than one operation from a queue 420 at a time. However, such a functional unit 400 may be configured to preserve the ordering of the multiple retrieved operations, for example by storing them within an internal queue.

After an operation has been retrieved from queue 420, the location of the head of the queue is updated to reflect the retrieval (block 616). For example, in one embodiment a functional unit 400 may adjust (e.g., increment) the value of the head register 407 as originally read to reflect the operation that was retrieved. The adjusted value may then be stored to head register 407.

Generally speaking, during the course of operation of a FIFO queue, the head pointer should not advance past the tail pointer; such a condition would generally correspond to retrieving an entry from the queue before that entry had been stored, which may result in corruption of the queue or incorrect operation. In some embodiments, hardware and/or software may be configured to maintain the relative consistency of the head and tail registers to avoid this condition, for example by generating an exception if pointer state becomes invalid. Also, in some embodiments, queues 420 may be configured to wrap when either head register 407 or tail register 409 exceeds the value of last register 405. For example, if head register 407 or tail register 409 is equal to last register 405, incrementing either register may result in setting that register equal to the value of first register 403. (In some embodiments, a queue 420 may be configured to progress from the last entry towards the first entry. In such embodiments, wrapping may occur from the first entry to the last entry in a manner similar to that just described.)

After retrieving an operation from a control word queue 420, a functional unit 400 may proceed to process that operation. In some embodiments, the control word specifying the operation may include information about parameters of the operation, such as one or more addresses corresponding to (possibly cacheable) areas in system memory 810 where input data for the operation may be found and where output data should be stored. During the course of processing the operation, a functional unit 400 may generate load and/or store activity to such areas. In some embodiments, the time required to complete the operation may depend on the operation itself, and/or characteristics of the data operated on.

Numerous possible techniques exist for the process that stored operations to queues 420 to ascertain the status of those operations. In one embodiment, software or hardware external to SPU 240 may monitor the head register 407 of a particular functional unit 400. By keeping track of where particular operations were stored within a queue 420 (for example, by tracking the value of tail register 409 at the time of operation storage, such as in step 600 of FIG. 6A), a process may assume that a given operation is complete after a subsequent operation has been retrieved from queue 420, which may be determined from changes in the value in head register 407. In other embodiments, a functional unit 400 may be configured to signal an interrupt to a software process when a particular operation is complete; software may then process the results of the operation. In still other embodiments, after storing one or more operations to a queue 420, software may be configured to wait or block (e.g., without performing further work) until the previously stored operations complete as signaled by a functional unit 400. For example, in some embodiments processor 10 may provide a special instruction or address that software may reference for this purpose.

In some embodiments, control/status registers 411 may be configured to allow software or external hardware to select a desired mode of notification when operations complete. For example, control/status registers 411 may include interrupt enables that may be configured by software, as well as other fields that may indicate the status of a particular functional unit 400 (e.g., whether a unit is busy, idle, or waiting to synchronize with another functional unit 400). Control/status registers 411 may include any suitable information to control the behavior or report the status of corresponding functional units 400. For example, in some embodiments control/status registers 411 may include respective enable bits that software may assert to enable the operation of a given functional unit 400 (e.g., at reset of processor 10 or core 100), error condition bits configured to report faults or exceptional events during processing, power mode bits configured to alter the operational behavior of a functional unit 400 according to a specified power mode, or any other suitable control or status information.

Synchronization of SPU Operations

As discussed above, in some instances, correct data processing may require that multiple different SPU operations be performed on data in a specified order. In the embodiments described above, different functional units 400 may be configured to retrieve new operations for processing as previously-retrieved operations complete, and as described above, the use of control word queues 420 to store operations prior to processing may ensure that stored operations are processed in order with respect to a particular functional unit 400. In order to ensure that operation ordering is preserved across different functional units 400, in one embodiment functional units 400 may support a particular type of SPU operation referred to as a synchronization operation.

Generally speaking, a synchronization operation or primitive may be any type of SPU operation that is configured to coordinate, control or synchronize the processing of other types of SPU operations. In one embodiment, a basic pair of synchronization operations denoted Suspend(X) and Resume(X) may be used to coordinate the behavior of a number of functional units 400. More details regarding the specific operation of one version of these operations is given below in conjunction with the description of FIG. 8. However, they may be briefly summarized as follows. In one embodiment, if a functional unit 400 retrieves a Suspend(X) operation from its corresponding queue 420, it may not retrieve any other operations from its queue 420 until another functional unit 400 has retrieved and processed a corresponding Resume(X) operation from its queue 420. Generally speaking, the argument X may be any parameter that serves to associate a particular Suspend( ) operation with a particular Resume( ) operation. In one embodiment, X denotes the memory address or other identifier of a particular control word within a queue 420, which is typically the memory address of a Suspend( ) operation itself. In such embodiments, processing of a given Resume(X) operation by a functional unit 400 may entail that functional unit 400 directly modifying location X within the queue 420 of the functional unit 400 having a corresponding Suspend(X) operation, as described in greater detail below. However, in some embodiments the argument X may include tokens other than memory addresses.

It is noted that while in some embodiments, software or external hardware may schedule and coordinate SPU operations using synchronization operations as described below, sequencing of steps of an individual operation may be performed by hardware within each functional unit 400 independently of software. That is, functional units 400 may be free-running with respect to individual operations.

Figure 7:
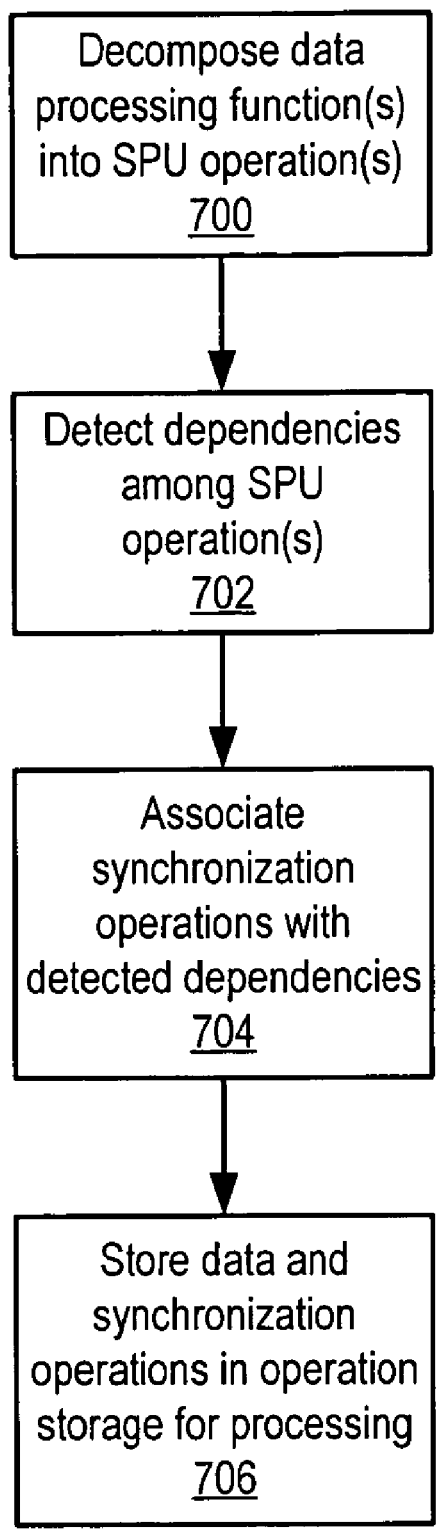
FIG. 7 is a flow diagram illustrating one embodiment of a method of scheduling synchronization operations.

In some embodiments, software may determine the need for synchronization operations before storing SPU operations within queues 420. One embodiment of such a method is illustrated in FIG. 7. Referring collectively to FIGS. 1-7, operation begins in block 700 where one or more data processing functions are decomposed into one or more SPU data processing operations. For example, a data processing function may include a request to transmit a data packet according to the SSL protocol. Correspondingly, in one embodiment software may determine that SSL packet transmission may be implemented by a hash SPU operation and a cipher CPU operation on the data packet.

Dependencies among the identified SPU operations may then be detected (block 702). For example, the SSL transmit operation may require that the hash SPU operation be followed in order by the cipher SPU operation. In some embodiments, software may be configured to concurrently detect ordering dependencies among a number of SPU operations. For example, multiple different packets may be requested to be transmitted, each of which may decompose into a pair of hash and cipher operations that may need to be ordered with respect to its corresponding packet, but not the operations corresponding to other packets.

Synchronization operations are then associated with the detected dependencies (block 704). For example, if a dependency dictates that a hash operation for a given packet completes before a cipher operation on the given packet begins, software may associate a Suspend-Resume pair of synchronization operations with the dependency. Specifically, in one embodiment software may ensure that a Suspend(X) operation is scheduled to occur prior to the cipher operation and a corresponding Resume(X) operation is scheduled to follow the hash operation.

Operations, including data operations and synchronization operations, are then stored into operation storage for retrieval and processing by functional units 400 (block 706).

For example, in one embodiment software may store the data operations and synchronization operations derived in previous steps to queues 420 according to the method illustrated in FIG. 6A.

In some embodiments, after identifying a number of SPU data processing operations (e.g., according to block 700 above), software may be configured to rearrange or schedule the collection of operations in order to maximize the utilization of functional units 400. For example, software may attempt to schedule operations so as to minimize the likelihood that functional units 400 will be idle or waiting for synchronization with other functional units 400, such as by attempting to intersperse unrelated, independent operations between dependent operations. In some embodiments, software may perform dependency detection as part of the analysis for such optimizations. Such software embodiments may variously ensure that appropriate synchronization operations are inserted into the schedule of operations once optimization is complete, or may explicitly include previously-inserted synchronization operations as part of the overall rearrangement and optimization of operations. For example, in some embodiments software may create a dependency graph or other type of data structure representing dependencies among a group of operations, and may insert synchronization operations into the schedule of operations after the schedule has been optimized according to the dependency graph. In other embodiments, explicit synchronization operations may be inserted as part of a software dependency detection step prior to optimization. Such synchronization operations may then be rearranged along with the operations they synchronize according to the optimization algorithm used.

Figure 8:
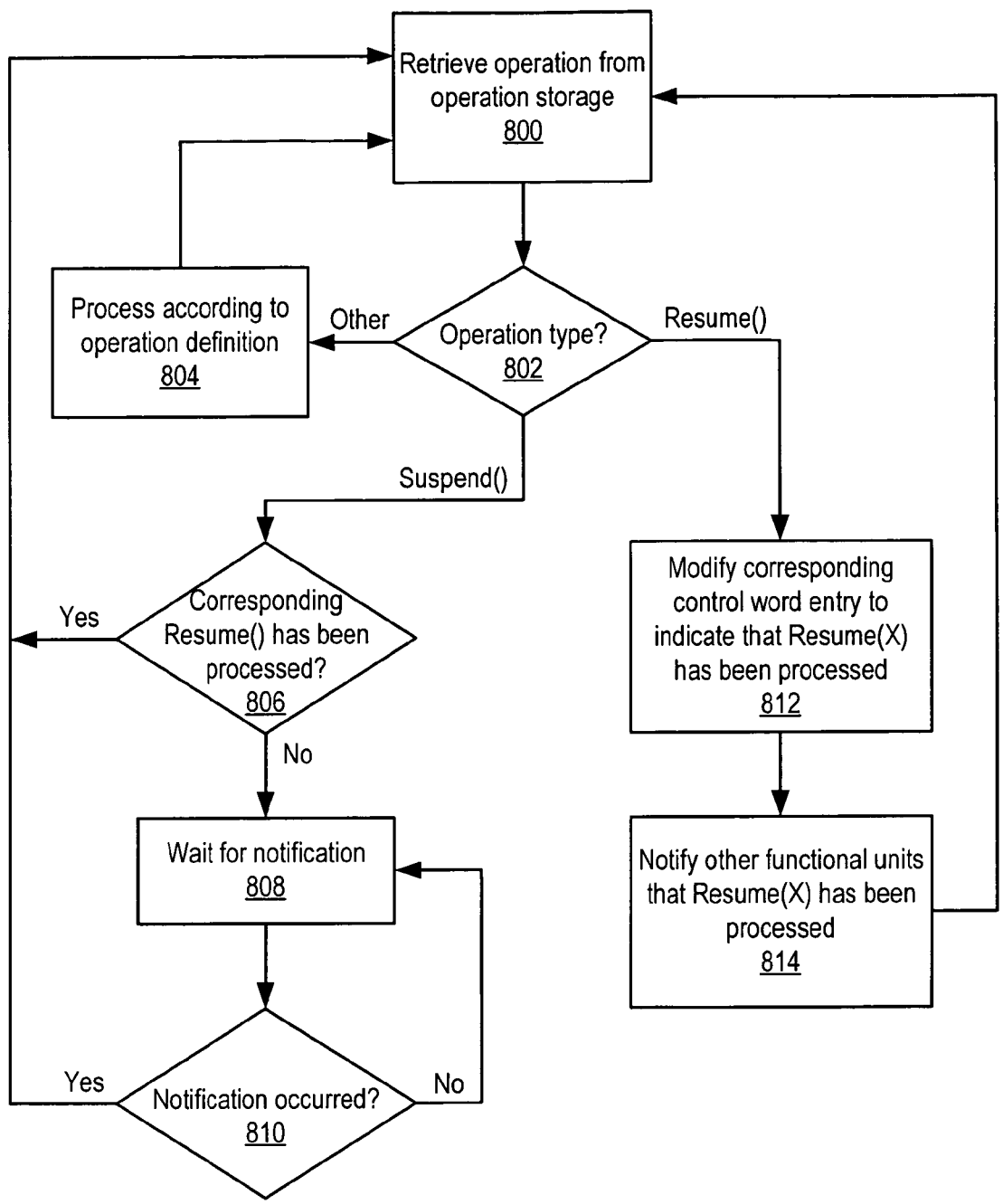
FIG. 8 is a flow diagram illustrating one embodiment of a method of processing operations that may include synchronization operations.

In one embodiment, the encoding format for control word entries within queues 420 may include a field of one or more bits reserved for synchronization purposes (e.g., in addition to bits identifying the type of the operation, location of operands or parameters, etc. as described above). Including a synchronization field within entries of queues 420 may facilitate the processing of synchronization operations by functional units 400. One embodiment of a general method of operation processing that may be implemented by a given functional unit 400 is illustrated in FIG. 8. Referring collectively to FIGS. 1-8, operation begins in block 800 where an operation is retrieved from operation storage. For example, in one embodiment a functional unit 400 may be configured to retrieve an operation from a control word queue 420 according to the method illustrated in FIG. 6B. In some embodiments, the action of block 800 may be contingent upon whether an unprocessed operation exists within a queue 420. For example, a functional unit 400 may be configured to determined whether a queue 420 is empty or not empty, as described above, and to take no action if queue 420 is empty.

After retrieving a particular operation, its type is determined (block 802). For example, a functional unit 400 may determine whether the particular operation is a Suspend(X) operation, a Resume(X) operation, or another type of operation such as a data operation. If the operation is a data operation, it may be processed according to the definition of the operation, for example as a hash operation, a cipher operation, etc. (block 804). In some embodiments, such processing may include retrieving operands from and/or storing results to a queue 420, another area of system memory 810, or another location or data structure within SPU 240. Subsequent to operation processing, another operation (if one is present) may be retrieved (block 800).

If the operation is a Suspend(X) operation, the synchronization field of the operation is checked to determine whether a corresponding Resume(X) has already been processed (block 806). For example, in one embodiment functional unit 400 may be configured to examine the synchronization bit or bits of a Suspend(X) operation to determine whether those bits have been cleared, deasserted or otherwise indicate that a corresponding Resume(X) has previously been processed. If a corresponding Resume(X) has already been processed, operation proceeds from block 800 where another operation (if one is present) may be retrieved from operation storage.

If the synchronization field of a Suspend(X) operation indicates that no corresponding Resume(X) has yet been processed, the functional unit 400 waits until it receives an indication that the corresponding Resume(X) has been processed (block 808). In some embodiments, a functional unit 400 may wait by sporadically or continuously refetching the Suspend(X) operation from its entry within queue 420 and retesting the synchronization field to determine whether it has changed. However, refetching and retesting in this manner may waste memory bandwidth, as unsuccessful tests do not allow the waiting functional unit 400 to progress. Correspondingly, in the embodiment of FIG. 5, functional unit 400 may be configured to wait by placing the address or token X within suspend register 413 and awaiting notification by another functional unit 400 that the corresponding Resume(X) has been processed.

The functional unit 400 may determine whether such notification has occurred (block 810). For example, in one embodiment a functional unit 400 that is waiting for notification of a Resume(X) operation may receive, from another functional unit 400, an address or token along with an indication that a Resume( ) has been processed (e.g., via a broadcast mechanism or other suitable interface). In such an embodiment, notification may occur if the waiting functional unit 400 determines that the received address or token matches the one (e.g., X) stored within suspend register 413. If notification occurs, operation may proceed from block 800. Otherwise, the functional unit 400 may continue to wait (block 808).

If the operation type determined in block 802 is a Resume (X) operation, the synchronization field of the control word entry within queue 420 that corresponds to address or token X is modified to indicate that the Resume(X) has been processed (block 812). For example, in one embodiment the functional unit 400 may be configured to clear a bit of a control word located within system memory 810 at an address corresponding to X.

In embodiments where functional units 400 include respective suspend registers 413, a functional unit 400 that encounters a Resume(X) operation may also notify other functional units 400, such as by broadcasting or distributing an indication of the resume operation along with address or token X to other functional units 400 (block 814). This notification may cause waiting functional units 400 to cease waiting as described above. However, this step may be omitted in embodiments that do not employ suspend register 413 or similar techniques. Operation may proceed from block 800 subsequent to block 814 or 812, depending on the embodiment.

As an example of synchronization operation processing, several operations are shown stored within control word queues 420a-b of FIG. 5. In particular, hash control word queue 420a includes within entries H1-H4 an MD5 hash operation denoted hash1, a SHA-1 hash operation denoted hash2, and a SHA-256 hash operation denoted hash3, followed by a Resume(C3) operation, where C3 denotes the corresponding entry within cipher control word queue 420b. The latter queue includes within entries C1-C4 an AES operation denoted AES1, a DES operation denoted DES2, a Suspend(C3) operation, and another AES operation denoted AES3. In the illustrated embodiment, as described above and illustrated in FIG. 8, if cipher functional unit 400b reaches the Suspend(C3) operation before hash functional unit 400a has processed the Resume(C3) operation, cipher functional unit 400b may wait until the Resume(C3) operation has been processed. Alternatively, if hash functional unit 400a processes the Resume(C3) operation first, cipher functional unit 400b may not wait any substantial length of time when it encounters the Suspend(C3) operation.

In some embodiments in which suspend registers 413 are used, a race condition may exist where if two functional units 400 concurrently process respective Suspend(X) and Resume(X) operations, the waiting functional unit 400 may miss the notification. For example, if both synchronization operations execute concurrently, the waiting functional unit 400 might not update its suspend register 413 with address X until after another functional unit 400 has already issued its notification. In one embodiment, such a race condition may be avoided by implementing synchronization operations as atomic operations, such that only one functional unit 400 may process a synchronization operation at any given time, and that functional unit 400 must process its synchronization operation to completion before another functional unit 400 may begin processing a synchronization operation. For example, state machines or other control logic within processing logic 401 of functional units 400 may be configured to interact to enforce the atomicity or serialization of synchronization operations.

Depending on how synchronization operations are scheduled (e.g., by software storing operations into queues 420 as described above), several deadlock situations are possible. For example, if there does not exist at least one Resume( ) operation for each Suspend( ) operation, not all functional units 400 processing Suspend( ) operations may receive notification of a corresponding Resume( ) and may therefore wait indefinitely. Even if this condition is satisfied, other combinations of synchronization operations may cause deadlock (e.g., if operations {Suspend(A), Resume(B)} exist in one queue 420 while operations {Suspend(B), Resume(A)} exist in another queue 420). Generally speaking, deadlock conditions may be detectable and avoidable by the software scheduling the operations. However, in some embodiments, SPU 240 may be configured to detect deadlock conditions, for example by employing timers to determine when a functional unit 400 has been waiting an unusually long time for notification of a Resume( ), suggesting a deadlock condition. In such embodiments, SPU 240 or individual functional units 400 may generate a trap or exception in such cases, which may enable software to resolve the deadlock condition.

Although synchronization operations have been described above in the context of Suspend( ) and Resume( ) operations, it is contemplated that any suitable set of synchronization operations may be used, including operations having semantics or side effects other than those described above. In some embodiments, Suspend( ) and Resume( ) may not be implemented as discrete or distinct operations, but instead encoded within the control words of other SPU operations.

For example, in one embodiment, a Suspend( ) synchronization operation may be encoded as one or more bits within the control word of another operation, and interpreted variously as directing a functional unit 400 to suspend either before or after processing the other operation. (It is noted that including an explicit address or token X within a Suspend( ) operation may not be necessary in some embodiments, as the address or identifying information of the queue entry containing the Suspend( ) may serve to uniquely identify the Suspend( ) for a particular functional unit 400.) Similarly, in one embodiment a Resume(X) synchronization operation may be incorporated within the control word of another operation, for example by embedding the address or token X within an address field of the other operation. It is noted that synchronization operations such as Suspend( ) and Resume( ) may be understood to coordinate the processing of other types of operations regardless of whether the synchronization operations are implemented as distinct operations, or embedded or encoded within the other operations.

Additionally, it is contemplated that although the behavior of synchronization operations as described above may not specifically distinguish among queues 420, in some embodiments, synchronization operation functionality may be queue-specific. For example, in one embodiment, a Suspend (X) operation may be satisfactorily notified by a corresponding Resume(X) operation regardless of the functional unit 400 processing the Resume(X) operation. That is, notification of Resume( ) operations may occur using broadcast semantics from any queue 420 to all queues 420. However, in an alternative embodiment, the encoding of a Suspend( ) operation may be augmented to specify a particular queue 420, denoted Q, from which it expects to receive notification of a Resume( ). Such an operation may be denoted Suspend (X, Q), and may be processed in a manner similar to that shown in FIG. 8, excepting that only a Resume(X) instruction processed by a functional unit 400 corresponding to queue Q may be considered during the operation of blocks 806 and 810. Similarly, in one embodiment a functional unit 400 processing a Resume(X, Q) operation may be configured to notify only queue Q (rather than all queues 420) that Resume(X) has been processed.

Exemplary System Embodiment

Figure 9:
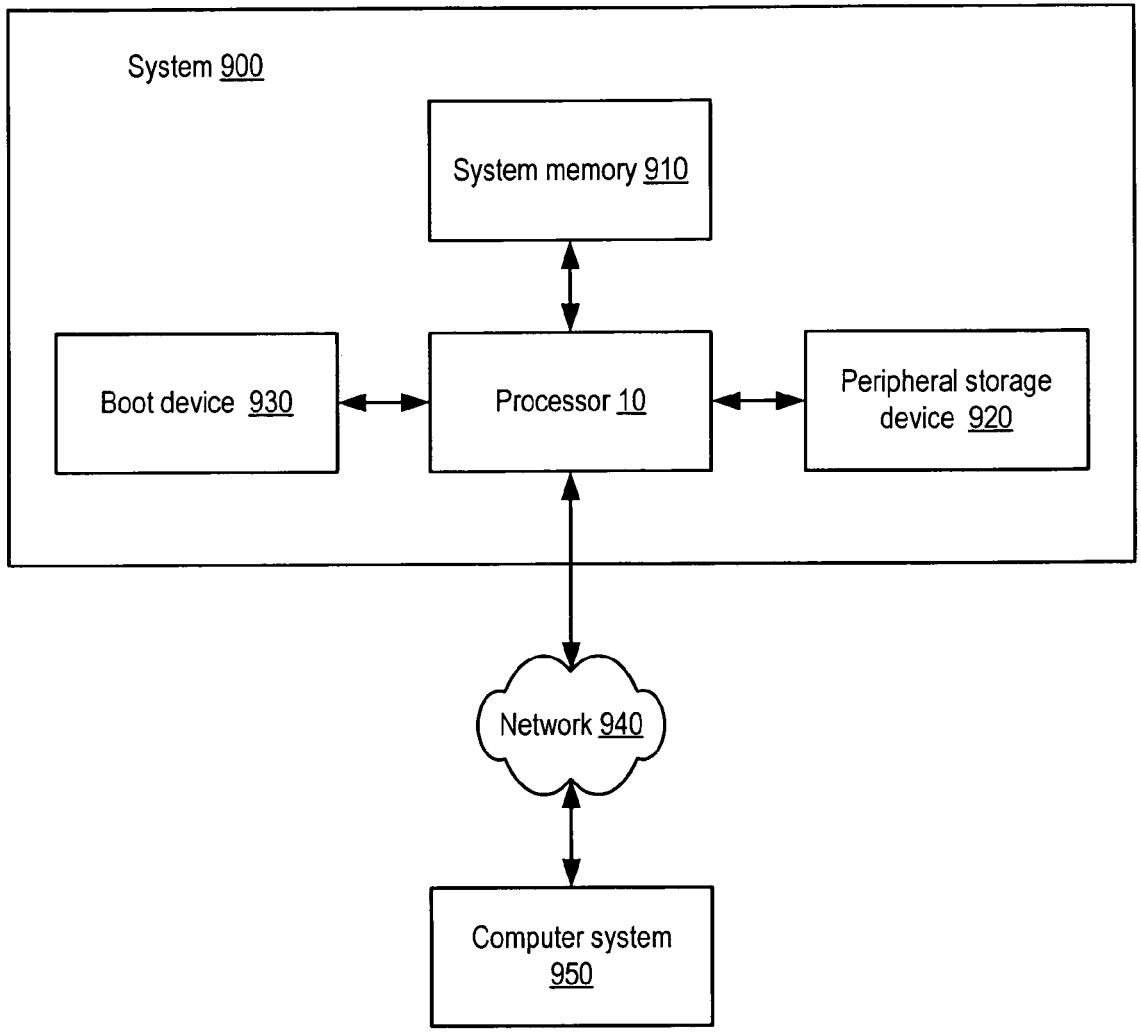
FIG. 9 is a block diagram illustrating one embodiment of a computer system.

As described above, in some embodiments processor 10 of FIG. 1 may be configured to interface with a number of external devices. One embodiment of a system including processor 10 is illustrated in FIG. 9. In the illustrated embodiment, system 900 includes an instance of processor 10 coupled to a system memory 910, a peripheral storage device 920 and a boot device 930. System 900 is coupled to a network 940, which is in turn coupled to another computer system 950. In some embodiments, system 900 may include more than one instance of the devices shown, such as more than one processor 10, for example. In various embodiments, system 900 may be configured as a rack-mountable server system, a standalone system, or in any other suitable form factor. In some embodiments, system 900 may be configured as a client system rather than a server system.

In various embodiments, system memory 910 may comprise any suitable type of system memory as described above, such as FB-DIMM, DDR/DDR2 SDRAM, or RDRAM®, for example. System memory 910 may include multiple discrete banks of memory controlled by discrete memory interfaces in embodiments of processor 10 configured to provide multiple memory interfaces 130. Also, in some embodiments system memory 910 may include multiple different types of memory.

Peripheral storage device 920, in various embodiments, may include support for magnetic, optical, or solid-state storage media such as hard drives, optical disks, nonvolatile RAM devices, etc. In some embodiments, peripheral storage device 920 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 930 may include a device such as an FPGA or ASIC configured to coordinate initialization and boot of processor 10, such as from a power-on reset state. Additionally, in some embodiments boot device 930 may include a secondary computer system configured to allow access to administrative functions such as debug or test modes of processor 10.

Network 940 may include any suitable devices, media and/or protocol for interconnecting computer systems, such as wired or wireless Ethernet, for example. In various embodiments, network 940 may include local area networks (LANs), wide area networks (WANs), telecommunication networks, or other suitable types of networks. In some embodiments, computer system 950 may be similar to or identical in configuration to illustrated system 900, whereas in other embodiments, computer system 950 may be substantially differently configured. For example, computer system 950 may be a server system, a processor-based client system, a stateless "thin" client system, a mobile device, etc.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A processor, comprising:
    a plurality of functional units, each configured to retrieve operations for processing from an operation storage, wherein each of said plurality of functional units is configured to process retrieved operations independently of each other one of said plurality of functional units; and
    instruction fetch logic configured to issue instructions for execution by the processor, wherein a subset of said instructions are executable to store operations for processing by said functional units into said operation storage, and wherein a given one of said subset of said instructions is executable on different occasions to store different types of said operations into said operation storage;
    wherein said instructions are defined within a programmer-visible instruction set architecture (ISA), and wherein said operations are not defined within said ISA;
    wherein said functional units are configured to retrieve and process said operations from said operation storage autonomously with respect to said instruction fetch logic and said subset of instructions; and wherein said operations stored by said subset of said instructions include synchronization operations configured to coordinate processing of other ones of said operations by said plurality of functional units.

2. The processor as recited in claim 1, wherein said synchronization operations include a suspend operation and a resume operation.

3. The processor as recited in claim 2, wherein in response to a given one of said plurality of functional units processing a particular suspend operation, said given functional unit is configured to suspend processing until receiving notification that a resume operation corresponding to said particular suspend operation has been processed.

4. The processor as recited in claim 1, wherein said functional units include a hash functional unit configured to process cryptographic hash operations and a cipher functional unit configured to process cryptographic cipher operations.

5. The processor as recited in claim 1, further comprising one or more execution units configured to execute said instructions issued by said instruction fetch logic.

6. The processor as recited in claim 5, wherein said one or more execution units include a load/store unit configured to execute said subset of said instructions.

7. A system, comprising:
the processor as recited in claim 1; and
a system memory coupled to said processor, wherein said system memory includes a plurality of addressable locations;
wherein said operation storage includes a respective control word queue corresponding to each of said plurality of functional units, wherein said respective control word queues map to corresponding addressable locations of said system memory.

8. The system as recited in claim 7, wherein storing a given one of said operations into said operation storage for processing by a given one of said plurality of functional units comprises storing a control word indicative of said given operation into a particular respective control word queue corresponding to said given functional unit.

9. The system as recited in claim 7, wherein said processor further comprises a cache, and wherein said respective control word queues are configurable to be stored within said cache.

10. A method, comprising:
issuing instructions for execution by a processor, wherein a subset of said instructions are executable to store operations into an operation storage for processing by a plurality of functional units, and wherein a given one of said subset of said instructions is executable on different occasions to store different types of said operations into said operation storage;
said plurality of functional units retrieving said operations for processing from said operation storage, wherein each of said plurality of functional units is configured to process retrieved operations independently of each other one of said plurality of functional units;
wherein said instructions are defined within a programmer-visible instruction set architecture (ISA) and wherein said operations are not defined within said ISA;
wherein said functional units are configured to retrieve and process said operations from said operation storage autonomously with respect to said issuing of said instructions for execution by said processor; and
wherein said operations stored by said subset of said instructions include synchronization operations configured to coordinate processing of other ones of said operations by said plurality of functional units.

11. The method as recited in claim 10, wherein said synchronization operations include a suspend operation and a resume operation.

12. The method as recited in claim 11, further comprising:
in response to a given one of said plurality of functional units processing a particular suspend operation, said given functional unit suspending processing until receiving notification that a resume operation corresponding to said particular suspend operation has been processed.

13. The method as recited in claim 10, wherein said functional units include a hash functional unit configured to process cryptographic hash operations and a cipher functional unit configured to process cryptographic cipher operations.

14. The method as recited in claim 10, further comprising executing said instructions issued by said instruction fetch logic within one or more execution units.

15. The method as recited in claim 14, further comprising executing said subset of said instructions within a load/store unit included within said one or more execution units.

16. The method as recited in claim 10, wherein storing a given one of said operations into said operation storage for processing by a given one of said plurality of functional units comprises storing a control word indicative of said given operation into a respective control word queue corresponding to said given functional unit.

17. The method as recited in claim 16, wherein said respective control word queue maps to corresponding addressable locations included within a system memory coupled to said processor.

18. A system, comprising:
a system memory; and
a processor coupled to said system memory, wherein said processor includes:
a plurality of functional units, each configured to retrieve operations for processing from an operation storage, wherein each of said plurality of functional units is configured to process retrieved operations independently of each other one of said plurality of functional units; and
instruction fetch logic configured to issue instructions for execution by the processor, wherein a subset of said instructions are executable to store operations for processing by said functional units into said operation storage, and wherein a given one of said subset of said instructions is executable on different occasions to store different types of said operations into said operation storage;
wherein said instructions are defined within a programmer-visible instruction set architecture (ISA), and wherein said operations are not defined within said ISA;
wherein said functional units are configured to retrieve and process said operations from said operation storage autonomously with respect to said instruction fetch logic and said subset of instructions; and
wherein said operations stored by said subset of said instructions include synchronization operations configured to coordinate processing of other ones of said operations by said plurality of functional units.

19. The system as recited in claim 18, wherein said synchronization operations include a suspend operation and a resume operation.

20. The system as recited in claim 19, wherein in response to a given one of said plurality of functional units processing a particular suspend operation, said given functional unit is configured to suspend processing until receiving notification that a resume operation corresponding to said particular suspend operation has been processed.

21. The system as recited in claim 18, wherein said functional units include a hash functional unit configured to process cryptographic hash operations and a cipher functional unit configured to process cryptographic cipher operations.

22. The system as recited in claim 18, wherein said processor further includes one or more execution units configured to execute said instructions issued by said instruction fetch logic.

23. The system as recited in claim 22, wherein said one or more execution units include a load/store unit configured to execute said subset of said instructions.

* * * * *